(12) United States Patent
Petr et al.

(10) Patent No.: US 10,647,843 B2
(45) Date of Patent: May 12, 2020

(54) POLYVINYL CHLORIDE PIPE

(71) Applicant: Rohm and Haas Company, Collegeville, PA (US)

(72) Inventors: Michael T. Petr, Trappe, PA (US); Steven R. Rapacki, Collegeville, PA (US)

(73) Assignee: Rohm and Haas Company, Collegeville, PA (US)

( * ) Notice: Subject to any disclaimer, the term of this patent is extended or adjusted under 35 U.S.C. 154(b) by 66 days.

(21) Appl. No.: 16/092,083

(22) PCT Filed: Apr. 19, 2017

(86) PCT No.: PCT/US2017/028333
§ 371 (c)(1),
(2) Date: Oct. 8, 2018

(87) PCT Pub. No.: WO2017/184709
PCT Pub. Date: Oct. 26, 2017

(65) Prior Publication Data
US 2019/0092935 A1    Mar. 28, 2019

Related U.S. Application Data

(60) Provisional application No. 62/455,167, filed on Feb. 6, 2017, provisional application No. 62/442,518, filed on Jan. 5, 2017, provisional application No. 62/325,040, filed on Apr. 20, 2016, provisional application No. 62/325,036, filed on Apr. 20, 2016.

(51) Int. Cl.
*C08L 27/06* (2006.01)
*F16L 9/127* (2006.01)
*F16L 9/12* (2006.01)

(52) U.S. Cl.
CPC .............. *C08L 27/06* (2013.01); *F16L 9/127* (2013.01); *C08L 2203/18* (2013.01); *C08L 2205/03* (2013.01); *C08L 2205/06* (2013.01); *F16L 9/12* (2013.01)

(58) Field of Classification Search
CPC .................................. C08L 27/06; F16L 9/127
USPC .......................................................... 524/62
See application file for complete search history.

(56) References Cited

U.S. PATENT DOCUMENTS

| 4,177,187 A | 12/1979 | Bohen |
| 4,325,856 A | 4/1982 | Ishikawa et al. |
| 4,499,045 A | 2/1985 | Obsomer |
| 4,632,656 A | 12/1986 | Eygelaar et al. |
| 4,654,397 A | 3/1987 | Mueller-Mall et al. |
| 4,692,295 A | 9/1987 | Vinatier |
| 4,797,426 A | 1/1989 | Waki et al. |
| 4,814,373 A | 3/1989 | Frankel et al. |
| 5,100,946 A | 3/1992 | Hung et al. |
| 5,203,190 A | 4/1993 | Kramer et al. |
| 5,449,487 A | 9/1995 | Jarvenkyla |
| 6,391,976 B1 | 5/2002 | Naka et al. |
| 2012/0189837 A1 | 7/2012 | Lavallee |

FOREIGN PATENT DOCUMENTS

| CN | 1186183 | 1/2005 |
| CN | 101508813 | 8/2009 |
| CN | 101670664 | 7/2012 |
| CN | 102827439 | 12/2012 |
| CN | 104262804 | 1/2015 |
| CN | 105038036 | 11/2015 |
| CN | 104017310 | 8/2016 |
| CN | 104109301 | 8/2016 |
| JP | 2015089895 | 5/2015 |
| KR | 100862029 | 10/2008 |

*Primary Examiner* — Deve V Hall
(74) *Attorney, Agent, or Firm* — Reid S. Willis

(57) ABSTRACT

The present invention relates to non-oriented and oriented polyvinyl chloride pipe comprising: a) polyvinyl chloride; b) from 2 to 5 parts by weight of polymeric processing aid per 100 parts by weight of the polyvinyl chloride; and c) from 1.6 to 2.0 parts by weight percent of a paraffin wax per 100 parts by weight of the polyvinyl chloride. The polyvinyl chloride pipe of the present invention comprises a concentration of paraffin wax lubricant (>1.5 parts per 100 parts polyvinyl chloride) heretofore unrecognized in the art, without the loss of key physical properties.

7 Claims, No Drawings

POLYVINYL CHLORIDE PIPE

BACKGROUND OF THE INVENTION

This invention relates to polyvinyl chloride (PVC) pipe and, in particular, a PVC pipe comprising a processing aid and an external lubricant.

Oriented polyvinyl chloride (o-PVC) pipes offer significant improvements over non-oriented PVC pipes by maintaining burst and impact strength of the pipe while reducing its weight. o-PVC pipe can be prepared by extruding a non-oriented pipe at about half the desired final diameter, then stretching the pipe in the radial direction to about twice the original diameter. The process provides a pipe wall thickness that is reduced by about half, with concomitant alignment (orientation) of the PVC chains, resulting in an increase in the strength of the PVC material. Thus, an o-PVC pipe is roughly half the weight and requires half the raw material of a regular PVC pipe, while maintaining or improving strength over the non-oriented pipe.

Despite its huge improvement over non-oriented PVC, o-PVC has encountered obstacles due to the economics of the process. Typically, o-PVC is made in a semi-batch process, wherein the pipe is extruded, cut into sections, heated to 100° C., and pressurized to expand. The labor and equipment required in such a process greatly increases the cost of o-PVC pipe. Alternatively, a continuous process can be used, wherein the extruded pipe is cooled to 100° C. and stretched over a mandrel. Though less expensive, the continuous process can only run at one third the rate of the extrusion process, which is limited by breaking of the PVC melt during stretching before achieving the full strain necessary to double the pipe diameter.

Process aids are known in the art. For example, U.S. Pat. No. 4,692,295 discloses certain PVC process aids containing a homopolymer of a vinyl monomer or a copolymer of at least two vinyl monomers for achieving orientation in a thermoplastic resin. U.S. Pat. No. 6,391,976 discloses a PVC foam process aid containing a powdered copolymer of methyl methacrylate and a $C_3$-$C_5$ methacrylic ester.

Nevertheless, there is a need to develop PVC formulations that give improvements in melt strength and improved formulation processibility, which would be expected to provide an increased run rate in the continuous stretching of PVC pipe.

SUMMARY OF THE INVENTION

The present invention addresses a need in the art by providing, in one aspect, a non-oriented polyvinyl chloride pipe comprising, based on the weight of the pipe:
a) polyvinyl chloride;
b) from 2 to 5 parts by weight of a polymeric processing aid per 100 parts by weight of the polyvinyl chloride; and
c) from 1.6 to 2.0 parts by weight percent of an external lubricant per 100 parts by weight of the polyvinyl chloride;
wherein the polyvinyl chloride has K-value in the range of 60 to 75;
wherein the polymeric processing aid comprises from 50 to 95 weight percent structural units of methyl methacrylate and from 5 to 50 weight percent structural units of a second monomer which is a $C_2$-$C_6$ acrylate or a $C_2$-$C_6$ methacrylate or a combination thereof;
wherein the external lubricant is a polyol ester or a paraffin wax; and
wherein the processing aid has a weight average molecular weight in the range of $5\times10^5$ Daltons to $5\times10^7$ Daltons.

In another aspect, the present invention is an oriented polyvinyl chloride pipe comprising, based on the weight of the pipe:
a) oriented polyvinyl chloride;
b) from 2 to 5 parts by weight of a polymeric processing aid per 100 parts by weight of the polyvinyl chloride; and
c) from 1.6 to 2.0 parts by weight percent of an external lubricant per 100 parts by weight of the polyvinyl chloride;
wherein the polyvinyl chloride has K-value in the range of 60 to 75;
wherein the polymeric processing aid comprises from 50 to 95 weight percent structural units of methyl methacrylate and from 5 to 50 weight percent structural units of a second monomer which is a $C_2$-$C_6$ acrylate or a $C_2$-$C_6$ methacrylate or a combination thereof; and
wherein the external lubricant is a polyol ester or a paraffin wax; and
wherein the processing aid has a weight average molecular weight in the range of $5\times10^5$ Daltons to $5\times10^7$ Daltons.

The present invention addresses a need by providing a combination of a processing aid and a paraffin wax in a non-oriented PVC pipe that allows for greater efficiency in the production of an oriented PVC pipe from the non-oriented pipe.

DETAILED DESCRIPTION OF THE INVENTION

In a first aspect, the present invention is a non-oriented polyvinyl chloride pipe comprising, based on the weight of the pipe:
a) polyvinyl chloride;
b) from 2 to 5 parts by weight of a polymeric processing aid per 100 parts by weight of the polyvinyl chloride; and
c) from 1.6 to 2.0 parts by weight percent of an external lubricant per 100 parts by weight of the polyvinyl chloride;
wherein the polyvinyl chloride has K-value in the range of 60 to 75;
wherein the polymeric processing aid comprises from 50 to 95 weight percent structural units of methyl methacrylate and from 5 to 50 weight percent structural units of a second monomer which is a $C_2$-$C_6$ acrylate or a $C_2$-$C_6$ methacrylate or a combination thereof;
wherein the external lubricant is a polyol ester or a paraffin wax; and
wherein the processing aid has a weight average molecular weight in the range of $5\times10^5$ Daltons to $5\times10^7$ Daltons.

As used herein, non-oriented polyvinyl chloride pipe, refers to PVC pipe that has not been subjected to expansion and biaxial orientation to form oriented PVC pipe. Non-oriented PVC pipe that has been subjected to expansion and biaxial orientation by any of a variety of processes well known in the art is oriented polyvinyl chloride pipe (o-PVC pipe).

The processing aid is a copolymer of methyl methacrylate and one or more monomers selected from the group consisting of $C_2$-$C_6$ acrylates and $C_2$-$C_6$ methacrylates. As used herein, the term "structural units" of a given monomer refers to the remnant of the monomer after polymerization. For example, a structural unit of methyl methacrylate is as illustrated:

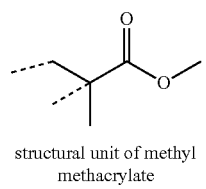

structural unit of methyl methacrylate where the dotted lines represent the points of attachment of the structural unit to the polymer backbone.

The processing aid can be prepared by any of a number of polymerization processes well known in the art. (See, for example, U.S. Pat. Nos. 4,325,856, 4,654,397, and 4,814,373.) Preferably, the processing aid comprises structural units of a) methyl methacrylate and b) one or more second monomers selected from the group consisting of butyl acrylate, butyl methacrylate, and ethyl acrylate. Preferably, the processing aid comprises from 50, more preferably from 60, and most preferably from 75 weight percent, to preferably 90, more preferably to 85 weight percent structural units of methyl methacrylate, based on the weight of the processing aid; and preferably from 10, and more preferably from 15 weight percent, to preferably 40, more preferably to 30, and most preferably to 20 weight percent structural units of the one or more second monomers. Preferably the concentration of the processing aid in the non-oriented PVC and o-PVC pipes is from 2.5, more preferably from 3.0 to 5.0 parts by weight per hundred parts of PVC.

The weight average molecular weight ($M_w$) of the processing aid is preferably in the range of from $1\times10^6$ Daltons, more preferably from $2\times10^6$ Daltons, to preferably $4\times10^7$ Daltons, more preferably to $2\times10^7$ Daltons, and most preferably to $1\times10^7$. As used herein, $M_w$ of the processing aid refers to the $M_w$ as measured against polystyrene calibration standards by way of gel permeation chromatography (GPC) with a refractive index detector, as described in ASTM D5296-11, using tetrahydrofuran and the mobile phase diluent. Number average molecular ($M_n$) is determined by the same methodology.

The external lubricant is a polyol ester or a paraffin wax. Preferred polyol esters have a melting point in the range of from 52° C. to 64° C. including pentaerythritol adipate stearate, commercially available as Advalube E-2100 lubricant. The paraffin wax is a linear or branched $C_{20}$-$C_{40}$ saturated hydrocarbon, preferably a $C_{20}$-$C_{40}$ saturated hydrocarbon or a mixture of $C_{20}$-$C_{40}$ saturated hydrocarbons with a melting point in the range of 50° C. to 70° C. Preferably, the concentration of the external lubricant, preferably the paraffin wax, is in the range of from 1.65, more preferably from 1.7 to preferably 1.9, more preferably 1.85 parts by weight per hundred parts by weight of the PVC. A commercially available paraffin wax is XL-165 paraffin wax.

K-values are correlated with solution viscosities and molecular weights of PVC as set forth in ISO 1628-2:1998. The preferred K-value range is from 65 to 70.

Non-oriented PVC pipe is prepared and converted into o-PVC by any of a number of conventional means, including those described in U.S. Pat. Nos. 5,203,190, 4,632,656, 5,449,487, and 4,499,045. Orientation is determined by AWWA-C909-16. The concentration of the various components does not change in the course of the orientation process; rather, the inner diameter of the pipe is expanded typically from a 40% to a 150% increase of the inner diameter of the non-oriented pipe, with concomitant orientation of PVC molecules. Thus, a non-oriented pipe with an inner diameter of 4" will be expanded to an inner diameter of 5.6" to 10" with no loss of strength of the pipe.

The non-oriented PVC and o-PVC pipes advantageously comprise other additives including, by weight per 100 parts by weight of PVC: preferably from 0.5 to 2 parts of a thermal stabilizer such as methyl or butyl reverse ester tin mercaptide, commercially available as Advastab TM-694 heat stabilizer; preferably from 0.2 to 3 parts of a pigment such as $TiO_2$; preferably from 1 to 10 parts of a filler such as calcium carbonate; preferably from 0.1 to 0.5 parts of a polyethylene metal release agent such as a low density oxidized, low molecular weight polyethylene homopolymer with a density of 0.93 g/cm³, a Mettler drop point of 101° C., and an acid value of 15, commercially available as AC-629 LDOxPE lubricant; and preferably from 0.4 to 2 parts of an ancillary lubricant such as calcium stearate.

In an example of a particular process for preparing non-oriented and o-PVC pipe of the present invention in a continuous fashion: a) PVC; b) a thermal stabilizer; c) a polyethylene metal release agent; d) an ancillary lubricant; e) pigment; f) a filler; g) a paraffin wax having a melting point in the range of 60° C. to 70° C.; and h) a high molecular weight acrylic processing aid are added to and blended by a high intensity blender. The resultant blend is then fed through a hopper into a twin screw counter rotating extruder fitted with externally applied heater zones to its barrel, with screw tempering capabilities. The extruder is fitted with a pipe head die (circular profile) with a suspended torpedo mandrel to achieve the tube shape as molten plastic is processed and exits the die. Processing temperatures in the extruder typically range from to 205° C. to 121° C. The tooling which is composed of the die and adapter to connect it to the extruder are typically heated to 150° C. to 235° C. Once the continuous molten stream in pipe shape (the non-oriented PVC pipe, also known as the PVC blank) exits the die, it is subjected to vacuum calibration and water cooling in a tank to help retain its shape. The pipe is next delivered through a water tank set at about 100° C. to condition the pipe to that temperature, then forced over a mandrel of fixed or variable dimension to stretch the pipe radially to orient the PVC molecules, thereby forming the o-PVC pipe. The continuous process is further conveyed downstream by a caterpillar type puller that directs it to a saw that cuts it to length. Alternatively, pipe can be produced by heating separately made PVC blanks and pushing them through a device that holds the mandrel to stretch the pipe radially.

It has surprisingly been discovered that significantly higher amounts of a paraffin wax lubricant, in combination with higher amounts of a high molecular weight processing aid, can be added to the PVC formulation than previously thought possible without deleterious impact on the final properties of the o-PVC pipe. In fact, the National Sanitation Foundation proscribes the use of a paraffin wax lubricant to a concentration at or below 1.5 parts by weight per 100 parts PVC because these higher amounts are known to degrade the impact strength of the pipe; moreover, such high concentrations of the paraffin wax lubricant cause buildup of lubricant on the die, resulting in splitting of the pipe. Significantly, higher concentrations of the processing aid correspond to a considerably higher orientation rate for the PVC pipe; higher concentrations of the paraffin wax correspond to a higher extrusion run rate when the higher molecular weight processing aid is used.

EXAMPLES

In the following tables, PA-1 refers to a processing aid which is a copolymer of methyl methacrylate (82 weight percent) and butyl acrylate (18 weight percent) and having a $M_w$ of 6.14×10⁶ Daltons and an $M_n$ of 4.0×10⁴ Daltons. PA-2 refers to a copolymer of methyl methacrylate (84 weight percent), butyl acrylate (12 weight percent) and butyl methacrylate (4 weight percent) and having a $M_w$ of 2.45×10⁶ Daltons and a $M_n$ of 6.0×10⁴ Daltons. The processing aids are prepared as aqueous dispersions but water is removed to form powders, which are combined with the PVC, the paraffin wax, and other additives. PA-b refers to a copolymer of methyl methacrylate (82 weight percent), butyl acrylate (9 weight percent), and butyl methacrylate (9 weight percent) and having a $M_w$ of 1.8×10⁶ Daltons and a $M_n$ of 2.0×10⁴ Daltons.

The $M_w$ and $M_n$ of PA-1, PA-2, and PA-b were determined following ASTM D5296-11 (2011) on an Agilent 1100 Series High Pressure Liquid Chromatograph ("HPLC") with two 20-μm MIXED-A columns and a Wyatt T-rEX refractive index detector using tetrahydrofuran as the mobile phase and diluent at 0.2 mL/min and room temperature. GPC samples were prepared in THF at a concentration smaller or equal to 0.3 mg/mL. The GPC samples were dissolved at room temperature without vigorous shaking. Upon complete dissolution, the GPC sample solution was filtered using Whatman™ 1-μm PTFE filter prior to the analysis.

Table 1 shows the comparison of torque, melt pressure before entering the die (Melt Pressure), and surface smoothness of the rod made from the PVC formulation (simulating the unoriented pipe) between a baseline PVC formulation and the formulations of the present invention. PVC K66 refers to PVC resin with a K-value of 66; TM-694 refers Advastab TM-694 heat stabilizer; and AC-629 refers to AC-629 LDOxPE lubricant. All amounts are in parts by weight per 100 parts of PVC K66 (phr).

TABLE 1

Torque, Melt Pressure, and Smoothness Comparisons for PVC Pipes

| | | | |
|---|---|---|---|
| PVC K66 (phr) | 100 | 100 | 100 |
| Calcium Stearate (phr) | 0.6 | 0.6 | 0.6 |
| TM-694 (phr) | 0.85 | 0.85 | 0.85 |
| AC-629 (phr) | 0.3 | 0.3 | 0.3 |
| TiO₂ (phr) | 0.6 | 0.6 | 0.6 |
| CaCO₃ (phr) | 5 | 5 | 5 |
| PA-b (phr) - baseline | 0.85 | — | — |
| PA-1 (phr) - Ex. 1 | — | 3 | — |
| PA-2 (phr) - Ex. 2 | — | — | 5 |
| XL-165 Paraffin Wax | 1.4 | 1.8 | 1.8 |
| Torque (meter-g) | 2170 | 2000 | 2070 |
| Melt Pressure (psi) | 1070 | 1035 | 1145 |
| Surface Smoothness | 10 | 8 | 9 |

The results show that comparable torque, melt pressure, and o-PVC surface smoothness was achieved at significantly higher run rates for the paraffin wax lubricant than what was believed to be possible.

The invention claimed is:

1. A non-oriented polyvinyl chloride pipe comprising, based on the weight of the pipe:
    a) polyvinyl chloride;
    b) from 2 to 5 parts by weight of a polymeric processing aid per 100 parts by weight of the polyvinyl chloride; and
    c) from 1.6 to 2.0 parts by weight percent of an external lubricant per 100 parts by weight of the polyvinyl chloride;
    wherein the polyvinyl chloride has K-value in the range of 60 to 75;
    wherein the polymeric processing aid comprises from 50 to 95 weight percent structural units of methyl methacrylate and from 5 to 50 weight percent structural units of a second monomer which is a $C_2$-$C_6$ acrylate or a $C_2$-$C_6$ methacrylate or a combination thereof;
    wherein the external lubricant is a polyol ester or a paraffin wax; and
    wherein the processing aid has a weight average molecular weight in the range of from 5×10⁵ Daltons to 5×10⁷ Daltons.

2. The non-oriented pipe of claim 1 wherein the processing aid comprises from 60 to 90 weight percent methyl methacrylate and from 10 to 40 weight percent of the second monomer which is butyl acrylate, butyl methacrylate, or ethyl acrylate or a combination thereof; wherein the processing aid has a weight average molecular weight in the range of from 1×10⁶ Daltons to 2×10⁷ Daltons; and wherein the concentration of the processing aid in the non-oriented polyvinyl chloride pipe is from 2.5 to 5.0 parts by weight per 100 parts by weight of the polyvinyl chloride.

3. The non-oriented pipe of claim 1 wherein the external lubricant is a paraffin wax at a concentration in the range of from 1.65 to 1.9 parts by weight per 100 parts by weight of the polyvinyl chloride.

4. The non-oriented pipe of claim 3 wherein the K-value of the non-oriented polyvinyl chloride pipe is from 65 to 70; and wherein the paraffin wax has a melting point in the range of from 60° C. to 80° C.

5. The non-oriented pipe of claim 1 which additionally comprises from 0.5 to 2 parts of a thermal stabilizer; from 0.2 to 3 parts of a pigment; from 1 to 10 parts of a filler; from 0.1 to 0.5 parts of a polyethylene metal release agent; and from 0.4 to 2 parts of calcium stearate.

6. The non-oriented pipe of claim 5 wherein the thermal stabilizer is methyl or butyl reverse ester tin mercaptide; the pigment is TiO₂; the filler is calcium carbonate; and the polyethylene metal release agent is a low density oxidized, low molecular weight polyethylene homopolymer with a density of 0.93 g/cm³, a Mettler drop point of 101° C., and an acid value of 15.

7. An oriented polyvinyl chloride pipe comprising, based on the weight of the pipe:
    a) oriented polyvinyl chloride;
    b) from 2 to 5 parts by weight of a polymeric processing aid per 100 parts by weight of the polyvinyl chloride; and
    c) from 1.6 to 2.0 parts by weight percent of an external lubricant per 100 parts by weight of the polyvinyl chloride;
    wherein the polyvinyl chloride has K-value in the range of 60 to 75;
    wherein the polymeric processing aid comprises from 50 to 95 weight percent structural units of methyl methacrylate and from 5 to 50 weight percent structural units of a second monomer which is a $C_2$-$C_6$ acrylate or a $C_2$-$C_6$ methacrylate or a combination thereof; and
    wherein the processing aid has a weight average molecular weight in the range of 5×10⁵ Daltons to 5×10⁷ Daltons.

* * * * *